United States Patent
Goodwin et al.

(10) Patent No.: US 9,892,345 B2
(45) Date of Patent: Feb. 13, 2018

(54) SYSTEM AND METHOD FOR CREATING A PREFERENCE PROFILE FROM SHARED IMAGES

(71) Applicant: International Business Machines Corporation, Armonk, NY (US)

(72) Inventors: Richard T. Goodwin, Dobbs Ferry, NY (US); Pu Huang, Yorktown Heights, NY (US); Ying Li, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/403,262

(22) Filed: Jan. 11, 2017

(65) Prior Publication Data

US 2017/0124434 A1 May 4, 2017

Related U.S. Application Data

(63) Continuation of application No. 14/662,361, filed on Mar. 19, 2015.

(51) Int. Cl.
   *G06K 9/00* (2006.01)
   *G06K 9/66* (2006.01)
   (Continued)

(52) U.S. Cl.
   CPC ........... *G06K 9/66* (2013.01); *G06F 17/3028* (2013.01); *G06F 17/30271* (2013.01);
   (Continued)

(58) Field of Classification Search
   CPC ........... G06K 9/00496; G06K 9/00523; G06K 9/00536; G06Q 50/01; G06Q 30/0251; G06Q 30/0255; G06Q 30/0256
   See application file for complete search history.

(56) References Cited

U.S. PATENT DOCUMENTS

| | | |
|---|---|---|
| 8,386,486 B2 | 2/2013 | Zhang et al. |
| 8,660,902 B2 | 2/2014 | Coulter |

(Continued)

FOREIGN PATENT DOCUMENTS

WO  2010141637 A1  12/2010

OTHER PUBLICATIONS

Tsujita et al., "Complete Fashion Coordinator: A Support System for Capturing and Selecting Daily Clothes with Social Networks", AVI '10 May 25-29, 2010, Rome, Italy.

Morris et al., "Remote Shopping Advice: Enhancing In-Store Shopping with Social Technologies", Proceedings of the 17th ACM Conference on Computer Supported Cooperative Work & Social Computing. ACM, 2014.

(Continued)

*Primary Examiner* — Wesley Tucker
(74) *Attorney, Agent, or Firm* — Harrington & Smith

(57) ABSTRACT

A method includes obtaining from an online social media site a plurality of instances of images of objects associated with a person; analyzing with a data processor the plurality of instances of the images with a plurality of predetermined style classifiers to obtain a score for each image for each style classifier; and determining with the data processor, based on the obtained scores, a likely preference of the person for a particular style of object. The plurality of instances of images of objects associated with the person can be images that were posted, shared or pinned by person, and images that the person expressed a preference for. In a non-limiting embodiment the object is clothing, and the style can include a fashion style or fashion genre including color preferences. A system and a computer program product to perform the method are also disclosed.

10 Claims, 5 Drawing Sheets

(51) Int. Cl.
　　　*H04L 29/08* (2006.01)
　　　*G06K 9/62* (2006.01)
　　　*G06K 9/52* (2006.01)
　　　*G06K 9/46* (2006.01)
　　　*G06F 17/30* (2006.01)
　　　*G06N 99/00* (2010.01)

(52) U.S. Cl.
　　　CPC .............. *G06K 9/4671* (2013.01); *G06K 9/52* (2013.01); *G06K 9/6256* (2013.01); *G06K 9/6267* (2013.01); *G06N 99/005* (2013.01); *H04L 67/306* (2013.01)

(56) References Cited

U.S. PATENT DOCUMENTS

| | | |
|---|---|---|
| 8,843,463 B2 | 9/2014 | Moritz et al. |
| 2007/0019261 A1 | 1/2007 | Chu |
| 2011/0066492 A1 | 3/2011 | Sumiyoshi et al. |
| 2011/0072047 A1 | 3/2011 | Wang et al. |
| 2011/0184832 A1 | 7/2011 | Wannier et al. |
| 2012/0239506 A1* | 9/2012 | Saunders ............... G06Q 30/02 705/14.67 |
| 2014/0214533 A1 | 7/2014 | Box et al. |

OTHER PUBLICATIONS

Greenhill et al, "Reframing Online Shopping Through Innovative and Organic User-Oriented Design", Reframing Human in Information Systems Development, Springer London, 2011. 243-262.

* cited by examiner

SYSTEM AND METHOD FOR CREATING A PREFERENCE PROFILE FROM SHARED IMAGES

CROSS REFERENCE TO RELATED APPLICATION

This patent application is a continuation application of copending U.S. patent application Ser. No. 14/662,361, filed on Mar. 19, 2015, the disclosure of which is incorporated by reference herein in its entirety.

TECHNICAL FIELD

The exemplary embodiments of this invention relate generally to image analysis, social media, predictive personal profiling, social media analytics and social data analytics.

BACKGROUND

Social media provides a means by which companies can understand the preferences, opinions and interests of customer and potential customers. This understanding is currently generated by analyzing text that people create and share. However, an increasing portion of the content found on social media is not text but is instead image-based and, thus, is not considered.

SUMMARY

A first non-limiting aspect of this invention pertains to a method that comprises obtaining from an online social media site a plurality of instances of images of objects associated with a person; analyzing with a data processor the plurality of instances of the images with a plurality of predetermined style classifiers to obtain a score for each image for each style classifier; and determining with the data processor, based on the obtained scores, a likely preference of the person for a particular style of object.

A second non-limiting aspect of this invention pertains to a system that is comprised of at least one data processor connected with at least one memory that stores software instructions. Execution of the software instructions by the at least one data processor causes the system to perform operations to obtain from an online social media site a plurality of instances of images of objects associated with a person; analyze the plurality of instances of the images with a plurality of predetermined style classifiers to obtain a score for each image for each style classifier; and determine, based on the obtained scores, a likely preference of the person for a particular style of object.

Another non-limiting aspect of this invention pertains to a computer program product comprised of software instructions on a computer-readable medium. Execution of the software instructions using a computer results in performing operations comprising obtaining from an online social media site a plurality of instances of images of objects associated with a person; analyzing with a data processor the plurality of instances of the images with a plurality of predetermined style classifiers to obtain a score for each image for each style classifier; and determining with the data processor, based on the obtained scores, a likely preference of the person for a particular style of object.

DETAILED DESCRIPTION

Figure 1:
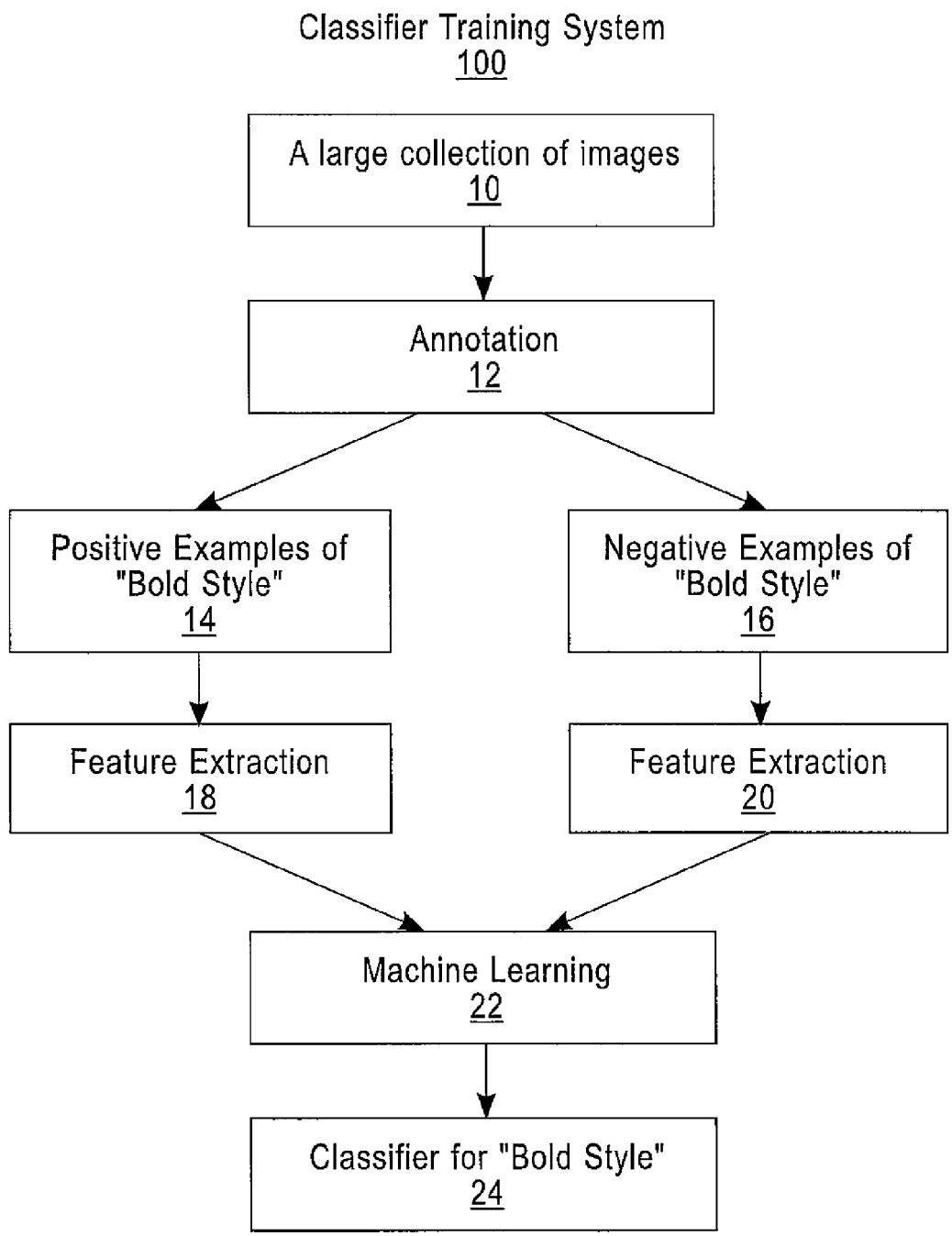
FIG. 1 illustrates a system architecture and logic flow pertaining to offline classifier training.

This invention provides a method, a system and a computer program product for analyzing images shared by people on social networks in order to determine a person's preferences and characteristics.

As considered herein an image can be a single still image as well as a moving image (a video) comprised of a multiplicity of images (frames). An image can be captured by a camera, such as a standalone digital camera or a camera integrated into a user device such as a mobile phone (e.g. a 'smartphone'). It is assumed that the data of a captured image can be uploaded or posted or pinned to a social network or social media website so that the image can be viewed by people other than the person who captured and/or uploaded the image. An uploaded image may or may not have been captured or otherwise generated by the person who actually uploads the image, and an uploaded image may or may not depict a person who is a user associated with a user's page or user's account of a particular social media website.

It is pointed out that the embodiments of this invention are not restricted to the use of images as uploaded content. For example, in some embodiments one or more audio files, such as music files, uploaded or posted by a person can be analyzed to determine information about the person's preference traits and preference characteristics.

Preference traits, in a manner analogous to psychological traits, can be considered to characterize various aspects of a person's personality. For example, traits can be considered as being fundamental to an individual. Furthermore, traits can be manifested in, for example, the clothes a person wears, the furniture a person buys and the music a person listens to. In general, a person's traits persist over time and circumstance and a person's traits can be shared with friends and family. By analyzing, for example, the images/videos/music that a person takes/listens to, shares and pins, the embodiments of this invention can identify traits and construct a preference profile for the person.

There are numerous uses for a personal preference profile. For example, by understanding a person's preference on a certain subject (e.g., fashion) one can then predict their propensity to select one item over another. In addition, it becomes possible to identify other individuals or groups with similar preferences for, as non-limiting examples, segmentation, collaborative filtering and product recommendations. Furthermore, one can track a ratio of different preferences and observe the evolution of that ratio over time.

Various sets of traits can be recognized from multimedia sources. Certain traits, such as for example a preference for a particular "fabric", e.g., cotton versus a polyester blend, or fine differences in hem length, etc., can be generally more challenging to recognize. However, many other preferences can be much more readily ascertained such as dressing style, color, pattern, music genre, etc. The importance of each trait in an overall set of traits can vary by how the generated profile will be used.

The embodiments of this invention pertain at least in part to user profiling and user segmentation as discussed in detail below.

There exist multiple ways to characterize a person's preferences and a resulting preference profile. One aspect of a person's preference profile can pertain to clothing color. Color preferences can be graded over a spectrum that runs from whites/beiges to pastels to 'vibrant' color(s) to blacks/greys. Color preferences can also be characterized by considering the season of the year during which an image is generated (e.g., summer clothing color preference vs. winter clothing color preference). Genre preferences can also be characterized, and the categories and genres can change with target audience and intended use. For the non-limiting example of women's clothing, various genre categories can include, for example, classic, romantic, casual chic, street, work and nightlife. A person's clothing style preferences are also amenable to classification, such as business attire, sporty, causal, bold, feminine and formal. A person's furniture style preferences are also amenable to classification, such as modern, country, traditional and Victorian. A person's music style preferences are also amenable to classification, such as country, blues, classical, rock, jazz and rap.

Thus, and while a personal preference profile of a certain person could contain a wide variety of subjects and sub-subjects, for describing the embodiments of this invention a "fashion preference" is used as a non-limiting example to illustrate the system architecture and methodology.

Reference is made to FIG. 1 for showing an architecture of a system 100 configured to perform classifier training. The classifier training system 100 is preferably performed offline and prior to the operation of the classification engine shown in FIG. 2. In this non-limiting example the style being trained on is "bold style", although any of the other styles mentioned above (e.g., "business attire", "sporty", "casual", etc.) could have been illustrated, as could in other instances a person's furniture preference(s), a person's music preferences, etc. The training employs a large collection of images 10. These could be stored in one or more databases and/or could be retrieved from online searches, from catalogs, from books and in general from any source of images. A next step/functional block pertains to image annotation 12. Image annotation, which can be assumed to be a classification or tagging or labeling of the image, can be accomplished with a human annotator, or with some automatic annotator using image recognition software, or with a combination of human and software annotators. The result of the image annotation 12 is the generation of some number of positive examples of "bold" style 14 and some number of negative examples of "bold" style 16 (i.e., examples of clothing styles that are not-bold, e.g., business or formal). The annotated images, which could be referred to as multimedia source "ground truth", can be stored in a database which could be referred to as a multimedia database. Annotated audio data can also be stored in the multimedia database.

A first feature extraction step/functional block 18 analyses the images in the positive examples of "bold" style 14 while a second feature extraction step/functional block 20 analyses the images in the negative examples of "bold" style 16. In some embodiments a single feature extraction step/functional block can be used to analyze both the positive and the negative image examples.

The feature extraction and analysis could be based on, as non-limiting examples, one or more of colored SIFT (CSIFT), GIST, Local Binary Patterns (LBP), Haar/Gabor features and Histograms of Oriented Gradients (HOG) feature extraction approaches and algorithms.

Feature extraction generally refers to the process and methodology of extracting information from a given media source. Features can be categorized as general or domain-specific. For the example of image data some general, low-level image features can include, as non-limiting examples: color, represented by color histogram, color correlogram, etc.; texture, represented by Gabor features, wavelet features, etc.; edge, represented by canny edge, Sobel edge, etc.; and shape, represented by boundary or region. For the example of audio data some audio features that can be extracted include: fundamental frequency; zero-crossing rate; energy; Mel-frequency cepstral coefficient (MFCC); and line spectral pairs (LSP). Domain-specific features are generally applicable in specialized domains such as human face recognition or fingerprint recognition.

Next, the results of the positive and negative feature extraction processes are passed to a machine learning step/functional block 22 that operates to derive a description of "bold" style. The machine learning step/functional block 22 could be based on, as non-limiting examples, one or more of a computer-implemented support vector machine (SVM), neural network, adaptive boosting (AdaBoost), decision tree learning, association rule learning, clustering; Bayesian network and reinforcement learning machine learning approaches and algorithms.

In general, and not as a limitation upon the practice of this invention, machine learning concerns the construction and study of systems that can learn from data. The core of machine learning deals with representation and generalization. Representation of data instances and functions evaluated on these instances are part of all machine learning systems. Generalization is the property that the system will perform well on unseen data instances. There are, in general, three different types of machine learning: supervised learning, where algorithms are trained on labeled examples; unsupervised learning, where algorithms operate on unlabeled examples; and semi-supervised learning, which combines both labeled and unlabeled examples to generate a classifier. In the preferred embodiments of this invention, but not as a limitation, the supervised learning approach is employed that uses the positive examples 14 and the negative examples 16 derived from the annotated collection of images, however the embodiments of this invention are not limited for use with only supervised machine learning.

Figure 4:
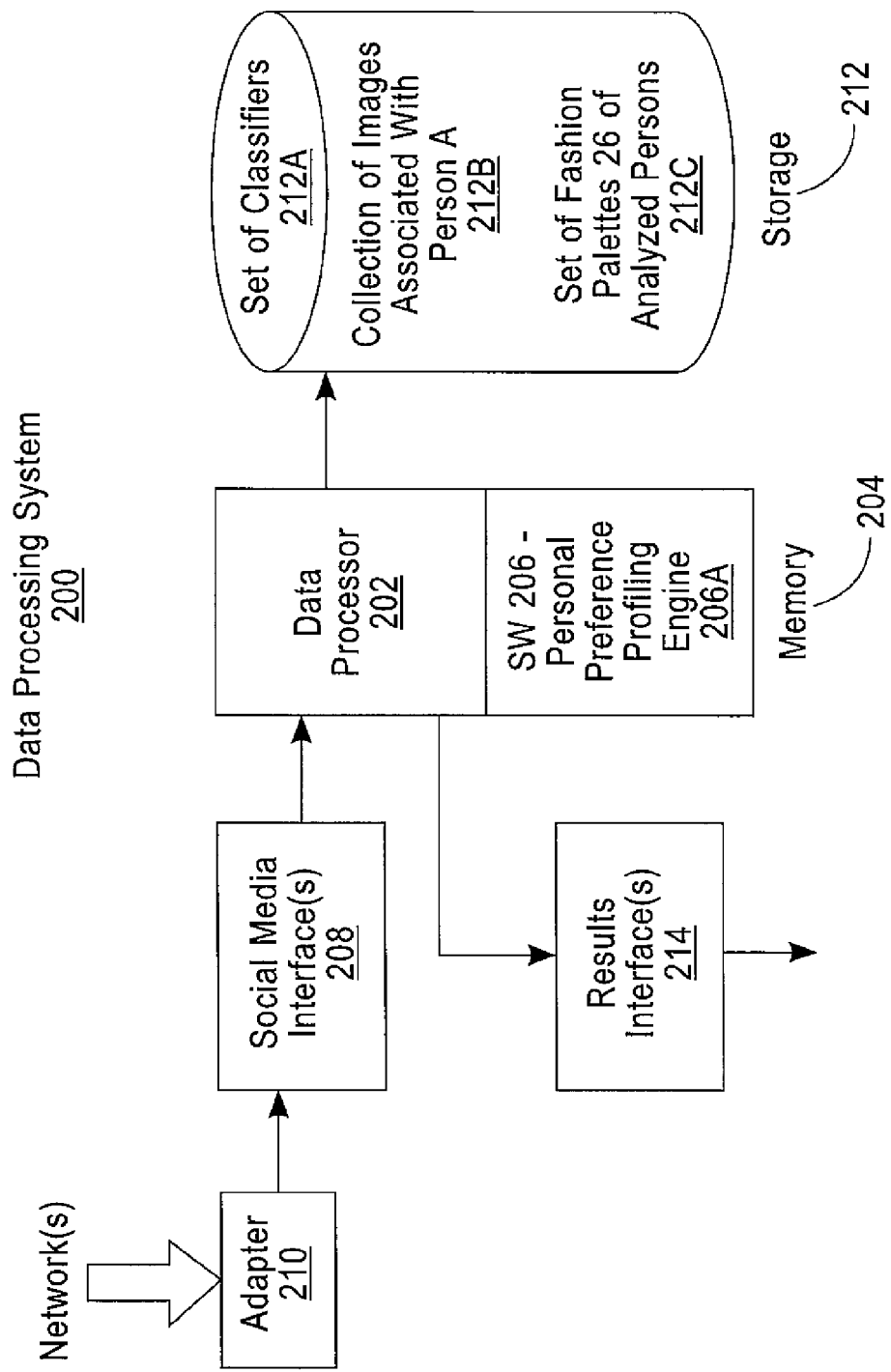
FIG. 4 shows a non-limiting example of an embodiment of a computer or data processing system 200 that can be used to realize one or more of the components of the systems shown in FIGS. 1-3.

The output of the machine learning step/functional block 22 of the system 100 is a data construct that is functional as a classifier for, in this non-limiting example, "bold" style 24. The classifier can then be applied to image data viewable on and/or retrieved from various social network and other sites where a person has uploaded an image or images with the intent that the image(s) be shared/posted/pinned so that they can be viewed by others. The classifier is applied to the viewed images in order to determine the person's style preference(s). During this process other similarly derived classifiers for other styles, such as business attire, sporty, casual, etc., can also be applied to the image data. A collection or group or an assemblage of such classifiers is shown in FIG. 4 as the set of classifiers 212A. Other non-style classifiers can also be used such as, but not limited to, a color preference classifier and a genre preference classifier. If the person's shared/posted/pinned images include, for example, in-door scenes then other classifiers, such as a furniture style classifier (if the in-door image shows one or more instances of furniture), can also be deployed.

Figure 2:
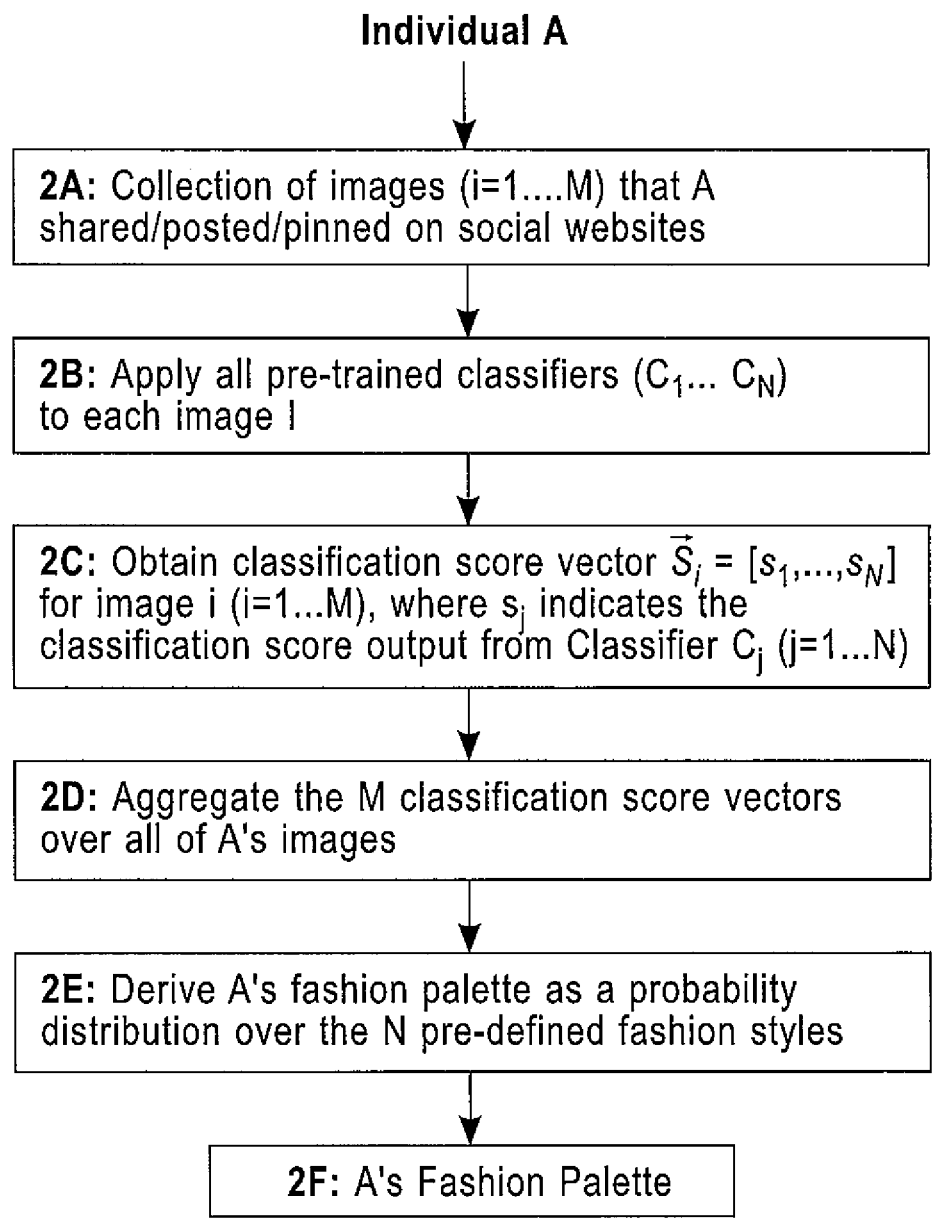
FIG. 2 shows a system architecture and methodology for deriving a person's (Person A) fashion profile, and can also be understood to depict a personal preference profiling engine that is shown in FIG. 4.

FIG. 2 shows a system architecture and methodology for a derivation of a person's (Person A) fashion profile. FIG. 2 can also be understood to depict a personal preference profiling engine 206A that is shown in FIG. 4. In operation, an embodiment of the personal preference profiling engine 206A enables a person's fashion profile to be derived as a probability distribution over the pre-defined N fashion styles or genres.

2A: A collection of images (i=1 . . . M) is obtained from one or more social media websites that Person A has shared/posted/pinned, where M represents a total number of images. These images can be considered to be in the public domain. It should be realized that the embodiments of this invention can also consider, in addition to images that the person has posted and thus placed in the public domain, images that the user has indicated a preference (e.g., a "like") for, even when the image was posted (in the public domain) by another person. Further in this regard, an image that the person shares with another person may be considered as an image that the person has a preference for. It is also within the scope of the invention to analyze other public domain postings by the person such as posts, blogs, etc., that a person shares online to extract preferences (e.g., fashion preferences) from the posts and blogs.

Given a social media site to which an access right exists the system can download the images that are posted by each user and associate the images with the users. The user could be any end user for which there is an interest in deriving his or her personal preference. Further, and since it is desirable to leverage the multimedia content that the user has posted on social site(s), it can be the case that the system begins with those users who have posted at least several images or videos.

2B: A next computer-implemented operation applies all or at least some pre-trained classifiers ($C_1$ . . . $C_N$) to each image i. These are the classifiers obtained at block 24 of FIG. 1 via the operation of the machine learning block 22.

2C: A next computer-implemented operation obtains a classification score vector $\overline{S}_i=[s_1 \ldots ,s_N]$ for image i(i=1 . . . M), where $s_j$ indicates the classification score output from classifier $C_j$ by applying it to image i 2D: A next computer-implemented operation aggregates the M classification score vectors over all of the images of Person A.

2E: A next computer-implemented operation derives the fashion profile or fashion palette of Person A as a probability distribution over N pre-defined fashion styles to yield at block 2F, as an output of the personal preference profiling engine 206A, a data construct that is descriptive of the fashion profile or fashion palette of Person A.

There are a number of possible techniques to aggregate the M classification score vectors for each individual.

A first non-limiting example of an aggregation technique is to find an average of all M vectors:

$$\vec{S} = \sum_{i=1}^{M} \vec{S}_i. \tag{1}$$

A second non-limiting example of an aggregation technique is to find a maximum of all M vectors:

$$\vec{S} = \operatorname*{Max}_{i}[\vec{S}_i]. \tag{2}$$

A third non-limiting example of an aggregation technique is to perform thresholding of each classification score to obtain a binary output (e.g., the classification score contains or does not contain Bold style). The process then counts the number of vectors (or images) falling into each style.

There are a number of possible techniques to derive the fashion palette for Person A.

In one non-limiting example the confidence scores in the aggregated vector are directly converted into the probability. For each fashion style i, Person A's probability of preferring that style ($p_i$) equals the percentage of Person A's images containing style i. That is, $$p_i = \left(\sum_{j=1}^{M} \operatorname{sgn}(s_{ji} - T_i)\right) / M, \tag{3}$$

where sgn( ) is a sign function, $s_{ji}$ is the confidence score of classifying $j^{th}$ image by the $i^{th}$ classifier and $T_i$ is the threshold for thresholding the confidence scores output by the $i^{th}$ classifier.

Another example involves characterizing by how much a certain person's fashion palette differs from the average, or from a peer group of the person. Using this approach one can assign a person to a segment. If $P_a$ represents a probability vector for Person A, then in this non-limiting embodiment there is an average $P_{segment\_i}$ calculated for each segment i—then the degree to which Person A is a member of the segment i is the dot product of two vectors:

$$P_a \cdot P_{segment\_i}/(|P_a| \, |P_{segment\_i}|). \tag{4}$$

Figure 3:
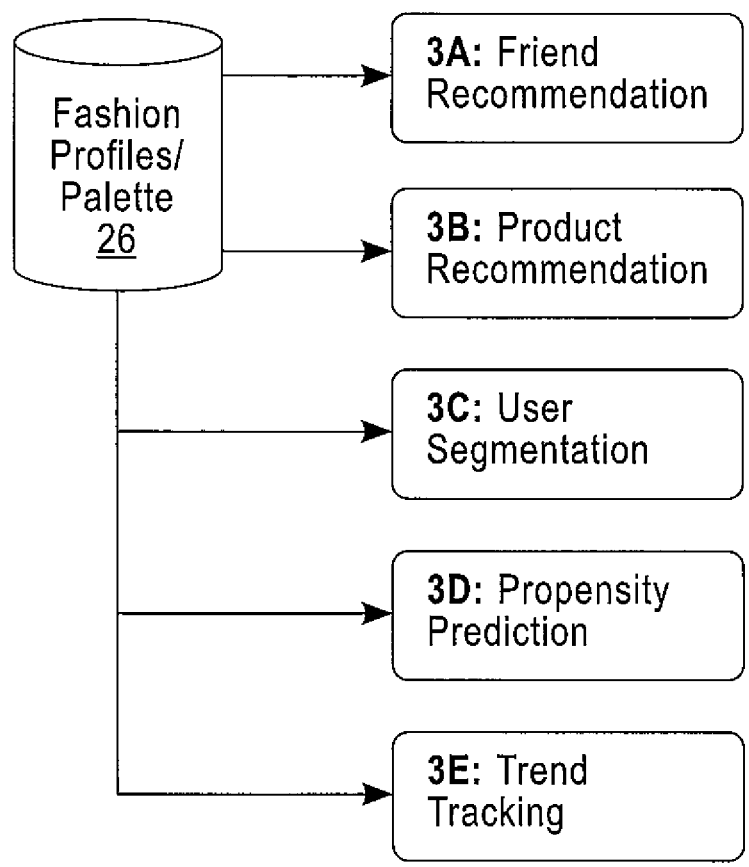
FIG. 3 depicts a system architecture and methodology for leveraging the fashion profiles/palette determined in FIG. 2.

Referring now to FIG. 3 there is shown a system architecture and methodology for leveraging the fashion profiles/palette 26 determined in Block 2E of FIG. 2. Not all of the actions depicted in Blocks 3A-3E need be performed in a particular instance.

At Block 3A the system can recommend other persons who share similar fashion profiles as Person A to be potential "friends" of Person A. This could occur, for example, while Person A is visiting a social media website.

At Block 3B the system can recommend products that are related to the fashion styles that Person A has evidenced an affinity for. For example, if Person A is found to prefer Bold style, then not only clothing but also shoes, bags, accessories, cosmetics, etc. that fall into the Bold style category can be recommended to Person A. This could occur, for example, while Person A is visiting a social media website, or whenever Person A is logged on to some website/browser, or by an email or instant message, or by mailing a solicitation. Such targeted marketing can be much more effective than blind marketing.

At Block 3C the system can segment persons into different groups based on their fashion preferences, along with other dimensions such as demographics. Segmenting users into different groups based on their preference profiles can effectively support targeted marketing.

At Block 3D the system can, based on a detected evolution over time of a particular person's fashion preference, predict the person's next "new" preference and act upon it accordingly. For example, as a certain person grows older the person's preference may change from Bold style to Feminine style, or from Casual style to Business style. Such information can be leveraged into, for example, product recommendations directed to that person. In propensity prediction the system can not only predict the propensity for a particular person, but also for a selected group of people (e.g., a group defined by an age range), a community, a state, or even a country. For example, by predicting a style propensity for people of a certain age within a certain geographic area it becomes possible to customize the stock/inventory of a store or stores within that area.

At Block 3E the system can track an overall fashion trend based on aggregated information from a number of persons that are followed and whose posted images are analyzed.

FIG. 4 shows a non-limiting example of an embodiment of a computer or data processing system 200 that can be used to realize one or more of the components of the systems shown in FIGS. 1-3. The data processing system 200 includes at least one data processor 202 connected with at least one computer-readable medium such as a memory 204 that stores computer readable program instructions (software (SW 206)) configured to perform all or some of the various operations described above. For example, the computer readable program instructions 206 can include instructions configured to execute the functionality of the personal preference profiling engine 206A of FIG. 2.

Connected with the data processor 202 are social media interface(s) 208 that in turn are connected to at least one external network via a suitable adapter 210. The adapter 210 can be considered in some embodiments to form a part of an enterprise intranet (e.g., a LAN or WLAN) and can also include an ability to connect to a wide area network (WAN) such as the internet. Via the adapter 210 and social media interface(s) 208 (e.g., a browser or browsers) the data processor 202 is enabled to view and possibly download images from social media website(s) that were uploaded or posted or pinned by a particular user (e.g., by Person A). The images are then acted on and processed by the personal preference profiling engine 206A as was discussed with reference to FIG. 2.

At least one data storage unit 212 is connected with the data processor 202. The data storage unit 212 can be configured to include a set of classifiers 212A (e.g., one for Bold style, one for Formal style, etc.) obtained in the manner shown in FIG. 1; a (temporarily stored) collection of images associated with the Person A for use by the personal preference profiling engine 206; and a set of fashion palettes/preferences of analyzed persons 212C. These latter items correspond to the output of the personal preference profiling engine as shown in Block 2F of FIG. 2.

In some embodiments the computer readable program instructions 206 could also be resident in the storage 212. In some embodiments some or all of the set of images 212B can be obtained from applicable servers as needed via the network connection, such as a LAN, WLAN or WAN, and thus may not be resident in the data storage 212.

The data processor 202 can also be connected with one or more results interfaces 214 whereby one or more of the fashion palettes 26 of the set 212C can be used for the purposes depicted in FIG. 3. For example, friend and/or product recommendations can be transmitted to certain persons and/or trend tracking results can be transmitted to some entity having an interest in tracked trends, etc. In some embodiments the functionality of the results interface(s) 214 could be subsumed by the interface 208 and adapter 210.

If the functionality of the personal preference profiling engine 206A is not included in the local SW 206 it could be resident in a separate processor or system or sub-system that is co-located with the data processor 202, or that is located remotely from data processor 202 and connected via one or more suitable interface(s).

In some embodiments the computer readable program instructions 206 can include instructions configured to execute the functionality of the classifier training system 100 shown in FIG. 1. In other embodiments the classifier training system 100 can be remotely located and operated and, in this case, the set of classifiers 212A can be received at the data processing system 200 via a communications network connection or via a data carrier such as disk or any portable memory device/medium or via any suitable technique that results in the set of classifiers 212A being resident in, or at least accessible to, the data processing system 200.

In some non-limiting embodiments the functionality of the personal preference profiling engine 206A and related components could be implemented as a service that is subscribed to by an enterprise.

In some embodiments the data processing system 200 can be physically located and instantiated at an enterprise, while in some other embodiments some or all of the data processing system 200 and related modules and sub-systems and memories (e.g., storage 212) can be implemented as a virtual system or systems hosted in the cloud either by the enterprise itself or by a third party cloud provider. The classifier training system 100 could also be implemented as a virtual system or systems hosted in the cloud.

It should thus be realized that, and in general, any computer programs that implement the embodiments of this invention can be embodied on the same platform, or the computer programs can be embodied on different platforms, where the platform or platforms can comprise one or both of a hardware instantiation or a virtual, cloud-based instantiation.

It should also be appreciated that an enterprise associated with the data processing 200 could be a provider of one or more online social media websites.

A non-limiting aspect of the embodiments of this invention is a computer system that includes one or more CPUs and one or more memories; a media database that includes a plurality of multimedia source classifications determined from a plurality of media sources; an interface that receives social media input from one or more of social media sources, where one or more of the social media inputs can have a user association with one or more social media inputs; a social media database for storing the social media inputs and associations with the respective social media users; a media classifier that classifies the social media inputs for one or more of the social media users into media classifications; a profiler that creates a user profile for one or more of the users by determining a correlation between the media inputs that the users are associated with and media image classifications; and a user segmenter that segments users into groups where people in the same group share similar preference profiles. The user association can include, for example, posting, a "like" or a friend recommendation. The media classification can include one or more of, for example, a fashion style, a music genre, a furniture style and/or a color. The media inputs can include one or more of at least visual image data and audio data.

In this non-limiting aspect of the invention the correlation between the media inputs and media image classifications can be performed by classifying all media inputs associated with a particular person into multiple media classes, with each class indicating one particular preference (such as a particular fashion style, a music genre, etc.). This is followed by aggregating the classification scores of all media inputs associated with a particular person and deriving that person's personal preference profiles accordingly.

In this non-limiting aspect of the invention additional processes and sub-systems that can be present include a user profile tracker, a user profile trend analyzer, a comparator of the user profile with general population statistics and a user propensity predictor. The system can recommend a product or a service to a person that is related to one or more of the person's determined preferences. The system may also recommend people who share similar preferences to be friends on a social network. The system can also segment people into groups, where people in the same group share similar preference profiles in order to effectuate targeted marketing to people in a particular group. Additional user segmentation can include, for example, segmentation based on one or both of geography, location and demographics.

The embodiments of this invention leverage social media data for deriving a person's fashion preferences. The embodiments of this invention do not require presenting a person with pre-selected images, and do not require that the person upload images in response to a request to do so. Instead, the embodiments of this invention can passively operate so as to use those images that the person has posted on social websites, as well as those images that the person has expressed a liking for and/or those images that the person has shared with another person. A person's posts, blogs, etc., that the person shared online can also be used to extract the person's (fashion) preferences.

The images that are considered can be any images that can be used to derive people's preferences in various aspects, i.e., they need not be images specific products targeted at testing people's responses to those products.

The embodiments of this invention do not require a person to explicitly indicate their particular interest on a certain subject such as fashion, or vehicles, or travel, and furthermore do not require an explicit input of a set of content requirements that are associated with such subject interest. Instead the embodiments of this invention begin with an image collection and then, based on an understanding of those images, derive the person's specific preferences. There is no need for the person to indicate a subject matter interest in the first place. The embodiments of this invention rely on image analysis and classification to understand the image content, and do not require textual information to be associated with the images.

Figure 5:
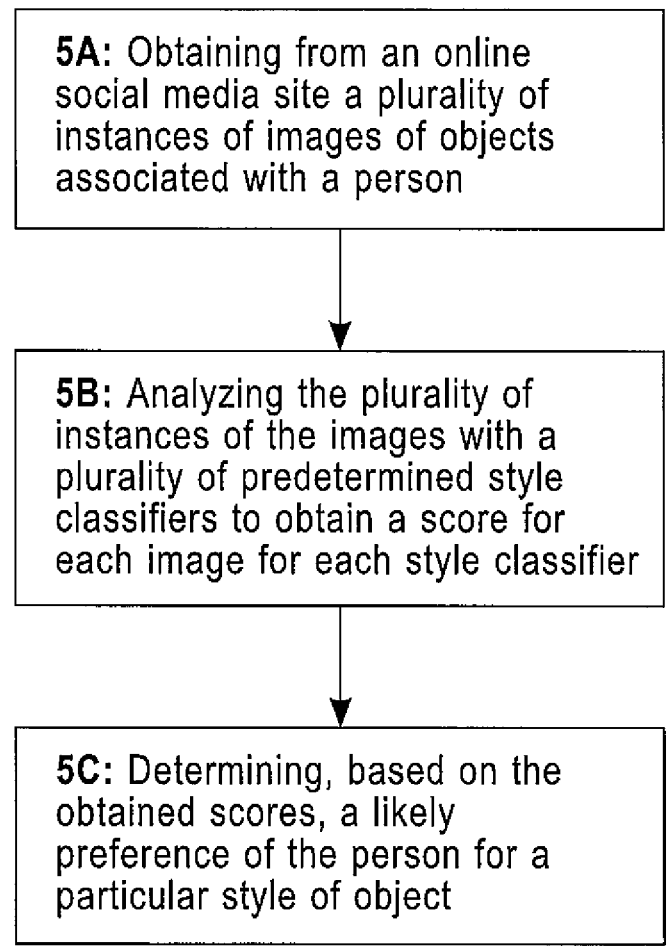
FIG. 5 is a logic flow diagram, in flowchart form, that is descriptive of a method of this invention.

Referring now to FIG. 5 there is shown an example of the operation of a method and process in accordance with the embodiments of this invention. At Block 5A there is a step of obtaining from an online social media site a plurality of instances of images of objects associated with a person. At Block 5B there is a step of analyzing the plurality of instances of the images with a plurality of predetermined style classifiers to obtain a score for each image for each style classifier. At Block 5C there is a step of determining, based on the obtained scores, a likely preference of the person for a particular style of object.

In the method shown in FIG. 5, the likely preference of the user can be used to at least recommend an object or objects to the person, and/or to recommend to the person another person having a similar preference, and/or to segment a plurality of persons into segments having similar preferences, and/or to track over time the person's preference to aid in predicting the person's likely preference at a future time.

In the method shown in FIG. 5, the step of analyzing comprises obtaining a classification score vector for each image for each classifier; aggregating the classification score vectors over all of the images; and deriving the likely preference of the person for a particular style of the object as a probability distribution over a plurality of pre-defined object styles.

In the method shown in FIG. 5, where there is an initial step of generating the plurality of predetermined classifiers by performing feature extraction on a plurality of positive style examples and negative style examples of annotated images, and performing machine learning on the extracted features to obtain a classifier specific for each type of style.

In the method shown in FIG. 5, where the plurality of instances of images of objects associated with the person can be images that were posted, shared or pinned by person, and could be images that the person expressed a preference for.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A method, comprising:
for a subject category of interest having a plurality N of sub-categories, where N is an integer greater than one, training over a first set of images a plurality of image classifiers to yield a plurality of pre-trained classifiers ($C_1 \ldots C_N$), where each individual one of the pre-trained classifiers is trained to recognize one sub-category of the plurality of sub-categories;
obtaining a second set of images (i=1 ... M) from at least one social media web site that a person has shared/posted/pinned or otherwise expressed an interest in, where M represents a total number of images in the second set of images;
applying at least some of the pre-trained classifiers ($C_1 \ldots C_N$) to each image i in the second set of images;

obtaining a classification score vector $\vec{S}_i=[s_1 \ldots s_N]$ for image i(i=1 ... M), where $s_j$ indicates a classification score output from a classifier $C_j$ by applying it to image i;

aggregating the M classification score vectors over all of the images of the second set of images;

deriving a data construct that is descriptive of a preference profile of the person with respect to the sub-categories of the category of interest as a probability distribution over the N sub-categories; and characterizing by how much the person's profile differs from an average profile of a group of persons by assigning the person to a segment, where $P_a$ represents a probability vector for the person, and calculating an average $P_{segment\_i}$ for each segment i, where a degree to which the person is a member of the segment i is a dot product of the two vectors:

$$P_a \cdot P_{segment\_i}/(|P_a| \, |P_{segment\_i}|).$$

2. The method of claim 1, where the category is fashion, and where the sub-categories are each a particular fashion style.

3. The method of claim 1, where aggregating the M classification score vectors comprises finding an average of all M classification score vectors:

$$\vec{S} = \sum_{i=1}^{M} \vec{S}_i.$$

4. The method of claim 1, where aggregating the M classification score vectors comprises finding a maximum of all M classification score vectors:

$$\vec{S} = \text{Max}_i[\vec{S}_i].$$

5. The method of claim 1, where aggregating the M classification score vectors comprises thresholding each classification score to obtain a binary output and counting the number of classification score vectors falling into each sub-category.

6. The method of claim 1, where deriving the profile of the person comprises converting confidence scores in the aggregated classification score vector into a probability, where for each sub-category the person's probability of preferring that sub-category equals the percentage of that person's second set of images containing that sub-category.

7. A method, comprising:
obtaining from an online social media site a plurality of instances of images of objects associated with a person;
analyzing with a data processor the plurality of instances of the images with a plurality of predetermined style classifiers to obtain a score for each image for each style classifier; and
determining with the data processor, based on the obtained scores, a likely preference of the person for a particular style of object; where
the method further comprises an initial step performed, for a subject category of interest having a plurality N of sub-categories, where N is an integer greater than one, training over a first set of images a plurality of image classifiers to yield a plurality of pre-trained classifiers ($C_1 \ldots C_N$), where each individual one of the pre-trained classifiers is trained to recognize one sub-category of the plurality of sub-categories;

where the step of obtaining comprises obtaining a second set of images (i=1 ... M) from at least one social media website that a person has shared/posted/pinned or otherwise expressed an interest in, where M represents a total number of images in the second set of images;

and where the steps of analyzing and determining comprise, applying at least some of the pre-trained classifiers ($C_1 \ldots C_N$) to each image i in the second set of images;

obtaining a classification score vector $\vec{S}_i=[s_1 \ldots s_N]$ for image i(i=1 ... M), where $s_j$ indicates a classification score output from a classifier $C_j$ by applying it to image i;

aggregating the M classification score vectors over all of the images of the second set of images;

deriving a data construct that is descriptive of a preference profile of the person with respect to the sub-categories of the category of interest as a probability distribution over the N sub-categories; and characterizing by how much the person's profile differs from an average profile of a group of persons by assigning the person to a segment, where $P_a$ represents a probability vector for the person, and calculating an average $P_{segment\_i}$ for each segment i, where a degree to which the person is a member of the segment i is a dot product of the two vectors:

$$P_a \cdot P_{segment\_i}/(|P_a| \, |P_{segment\_i}|).$$

8. The method of claim 7, where aggregating the M classification score vectors comprises one of:

finding an average of all M classification score vectors:

$$\vec{S} = \sum_{i=1}^{M} \vec{S}_i;$$

and finding a maximum of all M classification score vectors:

$$\vec{S} = \text{Max}_i[\vec{S}_i].$$

9. The method of claim 7, where aggregating the M classification score vectors comprises thresholding each classification score to obtain a binary output and counting the number of classification score vectors falling into each sub-category.

10. The method of claim 7, where deriving the profile of the person comprises converting confidence scores in the aggregated classification score vector into a probability, where for each sub-category the person's probability of preferring that sub-category equals the percentage of that person's second set of images containing that sub-category.

* * * * *